United States Patent
Allievi (10) Patent No.: US 12,473,176 B2
(45) Date of Patent: Nov. 18, 2025

(54) DEVICE FOR SANITIZING THE HANDRAIL OF AN ESCALATOR

(71) Applicant: Anna Castellaneta, Milan (IT)

(72) Inventor: Roberto Allievi, Milan (IT)

( * ) Notice: Subject to any disclaimer, the term of this patent is extended or adjusted under 35 U.S.C. 154(b) by 0 days.

(21) Appl. No.: 18/695,311

(22) PCT Filed: Nov. 2, 2021

(86) PCT No.: PCT/IT2021/000048
§ 371 (c)(1),
(2) Date: Mar. 25, 2024

(87) PCT Pub. No.: WO2023/079581
PCT Pub. Date: May 11, 2023

(65) Prior Publication Data
US 2025/0270073 A1    Aug. 28, 2025

(51) Int. Cl.
*B66B 31/02* (2006.01)
*A46B 9/02* (2006.01)
*A46B 11/00* (2006.01)
*A46B 17/02* (2006.01)

(52) U.S. Cl.
CPC ............. *B66B 31/02* (2013.01); *A46B 9/026* (2013.01); *A46B 11/0006* (2013.01); *A46B 11/0093* (2013.01); *A46B 17/02* (2013.01); *A46B 2200/3073* (2013.01)

(58) Field of Classification Search
CPC .................................. B66B 31/02; B08B 1/20
See application file for complete search history.

(56) References Cited

U.S. PATENT DOCUMENTS

| 2012/0273003 A1 | 11/2012 | Holloway |
| 2015/0251894 A1* | 9/2015 | Lake ........................ A01K 7/04 |
| | | 222/64 |

FOREIGN PATENT DOCUMENTS

| CN | 201481839 | | 5/2010 | |
| DE | 102011102750 A1 * | 11/2012 | ............. B66B 31/02 |
| DE | 202021100691 | | 3/2021 | |
| IT | UB20152593 | | 11/2015 | |
| WO | 2010027139 | | 3/2010 | |

OTHER PUBLICATIONS

Machine translation: Yu et al., WO2010027139 (Year: 2010).*
Machine translation: Zimmermann; DE202021100691 (Year: 2021).*
Machine translation: Maier et al. DE102011102750 (Year: 2012).*

* cited by examiner

*Primary Examiner* — Natasha N Campbell
(74) *Attorney, Agent, or Firm* — Themis Law (57) ABSTRACT

The invention in question relates to a sanitizing device for sanitizing the handrail of a movable person conveyor, for example an escalator or a moving walkway, the device comprising: A tank for containing a sanitizing substance, for example a sanitizing liquid; Means for connecting said sanitizing device to a part of the movable conveyor; A dispensing element of the sanitizing substance; And wherein a feeding path is included for feeding said sanitizing substance from the tank to the dispensing element.

11 Claims, 10 Drawing Sheets

DEVICE FOR SANITIZING THE HANDRAIL OF AN ESCALATOR

SCOPE OF THE INVENTION

The present invention relates to the technical sector relating to the sanitation of surfaces.

In particular, the invention refers to an innovative device particularly suitable for sanitizing handrails for mobile conveyors such as escalators.

OVERVIEW OF THE PRIOR ART

As is well known, an escalator is a system consisting of steps that move, in order to facilitate a user's journey in ascending and/or descending.

Escalators have been in widespread use for a very long time and are usually installed in airports, shopping malls, rail stations, etc.

Escalators are flanked on both sides by a vertical wall at the top of which there is a sliding handrail, in the form therefore of a closed rubber ring that moves more or less at the same speed as the stairs.

In this way, the user who is standing on a step that is moving, in order to better keep his balance, places his hands on the handrail moving at the same speed as the stairs.

It is therefore clear that there is a sanitation problem linked to the handrail that is in daily contact with thousands and thousands of hands.

Especially in this period of Covid-19 pandemic, contact sanitation is essential as the virus is not only present on all surfaces but has a certain resistance over time. Therefore, if the handrail is not continuously sanitized, there is a real risk of transmitting the virus to all those who touch the handrail in a contaminated area. The same reasoning applies to all viruses that are transmitted from hand to hand and potentially find support on such surfaces.

The same issue is found with mobile flat surfaces such as, for example, moving walkways (also called travelators) used for example in airports.

In the current state of the art, there are many specific devices for the sanitation of escalators or movable surfaces in general.

In one solution, for example, cleaning machines are used which can go up steps and release a sanitizing substance, for example steam at high temperature and/or pressure and/or various disinfectants.

Additional disinfectants can be sprayed on the handrail.

The strong limit of the known art is however evident.

In particular, the machines currently utilized for sanitation are particularly bulky and large in size and require specialized personnel for their use.

This implies high management costs.

Furthermore, according to these solutions, it is possible to carry out sanitation at a predetermined time (for example in the morning before opening to the public). The entire escalator, including the handrail, can therefore be sanitized at the start of the day. But, it is evident that the sanitation carried out will be effective during use for the first users of the escalator but as it is used, the handrail will be touched by several persons in succession who may infect the handrail with the risk that further subsequent users may become infected.

The current sanitation solution is therefore not functional in the current pandemic and Covid-19 situation, where a system is instead needed that continuously sanitizes the handrail of the escalator or of mobile surfaces in general and that therefore actually sanitizes while these are operating normally.

ITUB20152593 A1 discloses a device for sanitizing or cleaning a handrail of an escalator with the features of the preamble of claim 1

SUMMARY OF THE INVENTION

It is therefore an object of the present invention to provide an innovative sanitizing device that solves the aforementioned technical drawbacks.

In particular, it is an object of the present invention to provide an innovative device that performs sanitation (or sanitization) continuously during the normal operation of a moving conveyor, for example an escalator or a moving walkway (or conveyor belt or travelator), in such a way as to always guarantee a condition of perfect hygiene of the handrail while it is utilized.

It is also an object of the present invention to provide an innovative device capable of effectively sanitizing the handrails of mobile conveyors in order to prevent Covid-19 contact infections or other possible viruses.

These and other objects are achieved with the present device for sanitizing the handrail of a movable person conveyor, for example an escalator or a moving walkway, according to claim 1.

Said device comprises:

A tank for containing a sanitizing substance, for example a sanitizing liquid (for example in a mix of water with a disinfectant and/or sanitizer);

Means for connecting said device to a part of the movable conveyor, preferably on the outside of a wall of the conveyor or integrated inside the conveyor itself;

A dispensing assembly for the sanitizing substance;

And in which a feeding path is included for feeding said sanitizing substance from the tank to the dispensing assembly.

In this way all the above-mentioned technical drawbacks are easily resolved.

In particular, thanks to the designed device, it is now possible to connect this device directly to a part of the conveyor, for example to one of the two vertical walls that delimit said conveyor and to which the handrail is applied.

It is possible to apply one device for each handrail (therefore two devices for two handrails) in order to sanitize both the right and left handrails.

Following assembly, in this solution, it is possible to arrange for the dispensing assembly to face the handrail in utilization, in contact with it or at a certain distance from it, so as to be able to sanitize the handrail during its normal operation.

In this way it is possible to easily synchronize operation of said device with operation of the conveyor such that it is activated when the conveyor is activated and starts to move. In fact, when the conveyor is activated, the handrail begins to move. At this precise moment, the device, which is fixed in one position, can be activated and which thus releases the disinfectant substance always in one point towards the moving handrail, thus sanitizing it continuously over its entire length.

This solution is certainly much more functional than the prior art solutions described.

The dispensing assembly can release the substance through contact.

According to the invention, said dispensing assembly comprises at least one rotatable dispenser roller, for example provided with bristles on its external surface in such a way as to form a sort of rotatable cylindrical brush.

The release therefore occurs through contact.

The external surface of the rotating roller or rotating brush is such as to release the sanitizing substance through contact.

The roller can have various types of external surface, for example with bristles or spongy material, etc.

The device can therefore be positioned in such a way that the rotating roller (or brush) is in contact with the handrail, thereby releasing thereon the disinfectant substance that is fed to it.

Said rotating roller (or cylindrical brush, generally) can be arranged at least partly inside a collecting tray where, in utilization, the sanitizing substance coming from the tank is conveyed.

The rotating roller is thus partially immersed in said tray, soaking up the sanitizing substance which it releases through contact with the handrail.

Said rotating roller (or cylindrical brush) is mounted rotatably in idle mode.

For example, it is rotatably connected to the two opposite sides of the collecting tray. Special mounting pads can aid the rotation movement.

In this way the roller or brush are dragged into rotation directly by the motion of the handrail by being in contact with the moving handrail.

The roller (or brush) is therefore mounted idlingly inside the said collecting tray, automatically rotating by being dragged with the handrail and therefore disinfecting it continuously all along its length.

This solution is advantageous as it does not require motors to drive the roller (or brush) in rotation and is therefore an "ecological" solution.

According to a further advantageous aspect of the invention, the said feeding path can comprise at least one duct (5') which connects the tank 1 to the said collecting tray 8 in such a way as to be able to fill said collecting tray, in utilization, with the substance contained in the tank.

Advantageously, the distance between the tank and the collecting tray can be adjusted to different lengths, for example through a connection between the collecting tray and the tank with a telescopic arm 5.

The piping (for example, a common plastic tube) fluidly connecting the tank with the collecting tray can be of such length as to be able to cover the length ranges of the telescopic arm.

In this way, the entire assembly, consisting of the tray with the cylindrical roller mounted idlingly inside it, can be positioned in contact with the handrail on any type of escalator or conveyor in general, regardless of its dimensions.

This adjustment therefore allows the entire device to be positioned so that the roller is in contact with the handrail in any condition and on any conveyor.

Advantageously, the telescopic arm is also inclinable at different angles with respect to the tank in order to better position the entire device.

Advantageously, the duct 5' runs inside the section of the telescopic arm 5, so as not to be visible.

Advantageously, the three parts constituting the device as a whole, i.e. tank, arm and tray with brush or roller, can be easily disassembled/assembled thanks to the presence of quick couplings placed to hook the arm between tray and tank.

The means 11 for connecting the sanitizing device to said mobile conveyor are provided in correspondence with the tank.

Said means for connecting the sanitizing device to said mobile conveyor comprise quick coupling means 11.

For example, advantageously, said quick coupling means may comprise or be in the form of one or more suction cups 11.

This suction cup solution is particularly functional because it does not require invasive installation interventions, i.e. no work on the structure of the conveyor to which it is applied, allowing quick and removable application that can be carried out by anyone, even by unskilled personnel.

The suction cup solution in combination with the rotating roller inserted idlingly in the tray is on the whole an economic solution, easy to install and absolutely eco-compatible since it does not require motors or electricity for its operation nor any structural interventions for installation.

In addition, the tank can feed the tray by simple gravity and the idle rotation of the roller occurs through contact with and dragging by the handrail.

The solution that therefore combines a feeding of the collecting tray by gravity with the roller (or brush) mounted rotatably and idlingly in the collecting tray is the preferred solution as it enables the mounting of an autonomous device, which does not need either electric current or any other energy source to function. It is sufficient to fill the tank with the disinfectant liquid substance and this will be automatically fed to the tray by gravity. Motion of the handrail will then rotate the roller or brush partially immersed in the tray, thus automatically releasing the disinfectant substance on the handrail, all without any source of energy.

This solution is totally ecological.

If, in addition to what has been said, suction cups are used as quick coupling means, this allows the tank to be fixed to a structural part of the conveyor without intervention on the structure, therefore for an easy and immediate application.

In all the configurations described, a float 10 may also be provided in the collecting tray with a shut-off system (10', 10") of the duct (5', 8') which feeds the liquid into the collecting tray in such a way as to avoid the same from overflowing and allow it to be filled when the level drops below a preset value.

A particularly advantageous form of the invention therefore provides a device for sanitizing the handrail of a mobile people conveyor, for example an escalator or a moving walkway, the device comprising:

A tank (1) for containing a sanitizing substance, for example a sanitizing liquid;

Means (11) for connecting said device to a part of the movable conveyor;

An assembly (23, 8) that dispenses said sanitizing and/or disinfectant substance;

And wherein a feeding path (5') is included to feed said sanitizing substance by gravity from the tank to the dispensing assembly;

Said dispensing assembly (23, 8) comprising at least one cylindrical dispenser roller (23) and a collecting tray (8) and with said roller, for example a cylindrical bristle brush, rotatably mounted idlingly inside said collecting tray (8);

Wherein said feeding path comprises at least one duct (5') which on one side (3', 3") connects to the tank and on the opposite side connects to said collecting tray in such a way as to be able to feed it with said sanitizing substance;

Said tank being connected to the collecting tray through an arm (5), preferably adjustable to different lengths;

Said means for connecting the sanitizing device to said mobile conveyor are provided in correspondence with the tank and are in the form of quick coupling means (11), for example one or more suction cups, in such a way as to allow, in utilization, the tank to be fixed to a part of the mobile conveyor with the tank placed above the collecting tray, so that by feeding the collecting tray by gravity and with said idle rotating roller placed under said tank in contact with the handrail of the conveyor in such a way that it is rotated by the motion of said handrail.

In this way a totally ecological device is obtained in which the tray is filled whenever necessary by gravity and the roller releases and dispenses the substance on the handrail through contact thanks to the motion of the handrail that rotates the roller which thus soaks up the substance. Being partially immersed in the tray, the roller, with its rotation draws in and soaks up the substance which it spreads all along the length of the handrail.

The device is in fact fixed to the conveyor structure with the rotating roller in contact with the handrail and therefore driven into rotation by it.

Advantageously, said dispensing assembly (8, 23) can comprise a float (10) present in the tray (8) and which opens and closes supply of the liquid to the collecting tray, thereby avoiding any overflow.

The means for connecting the tank to the conveyor are preferably in the form of suction cups.

Advantageously, the arm 5 which connects the collecting tray to the tank is telescopic type.

Advantageously, the tray is connected to the arm through an external sleeve 9' mounted slidingly with respect to a guide placed transversally with respect to said arm 5 in such a way as to be able to adjust the distance between tray and arm 5.

Advantageously, means are provided for fixing the preselected position, thereby blocking the sliding of the outer sleeve with respect to the guide along which it is slidably mounted. Further advantages are obtained with the remaining dependent claims.

BRIEF DESCRIPTION OF THE DRAWINGS

Further advantages and additional characteristics of the present invention are highlighted with the following description of some embodiments, given by way of non-exhaustive examples, with reference to the attached drawings, in which.

Finally.

DESCRIPTION OF SOME PREFERRED EMBODIMENTS

Figure 1:
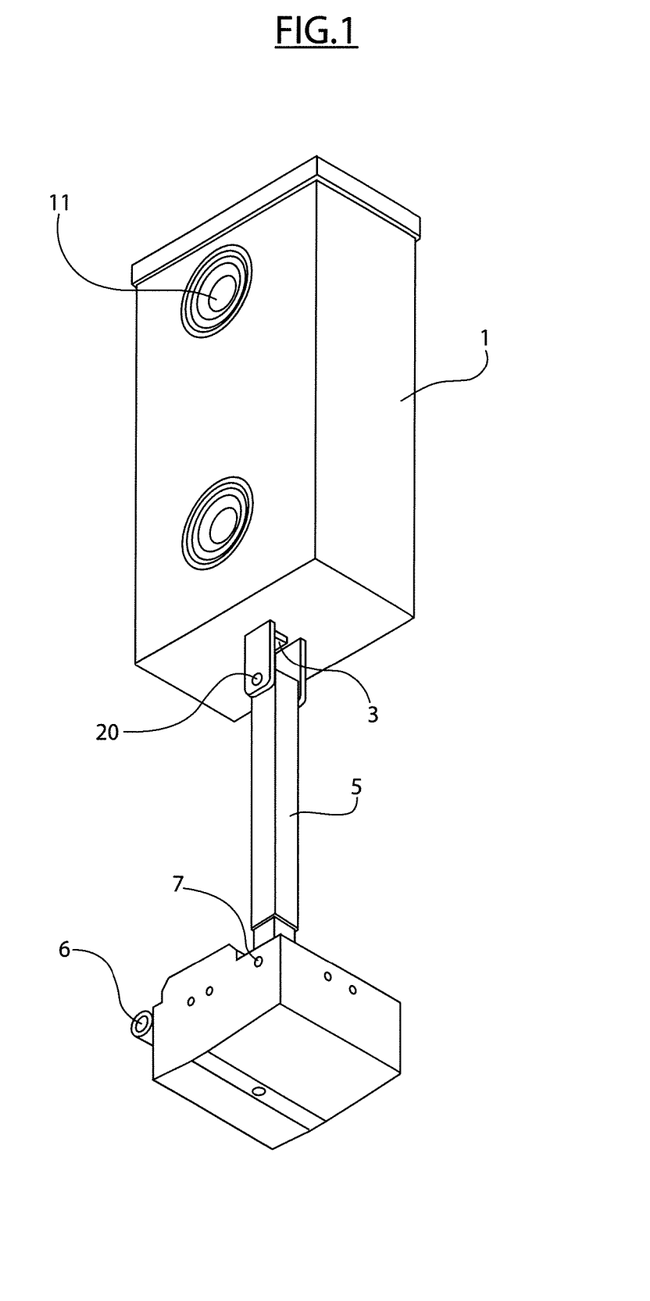
FIG. 1 and FIG. 2 both show two axonometric views of the present device according to the invention.
Figure 2:
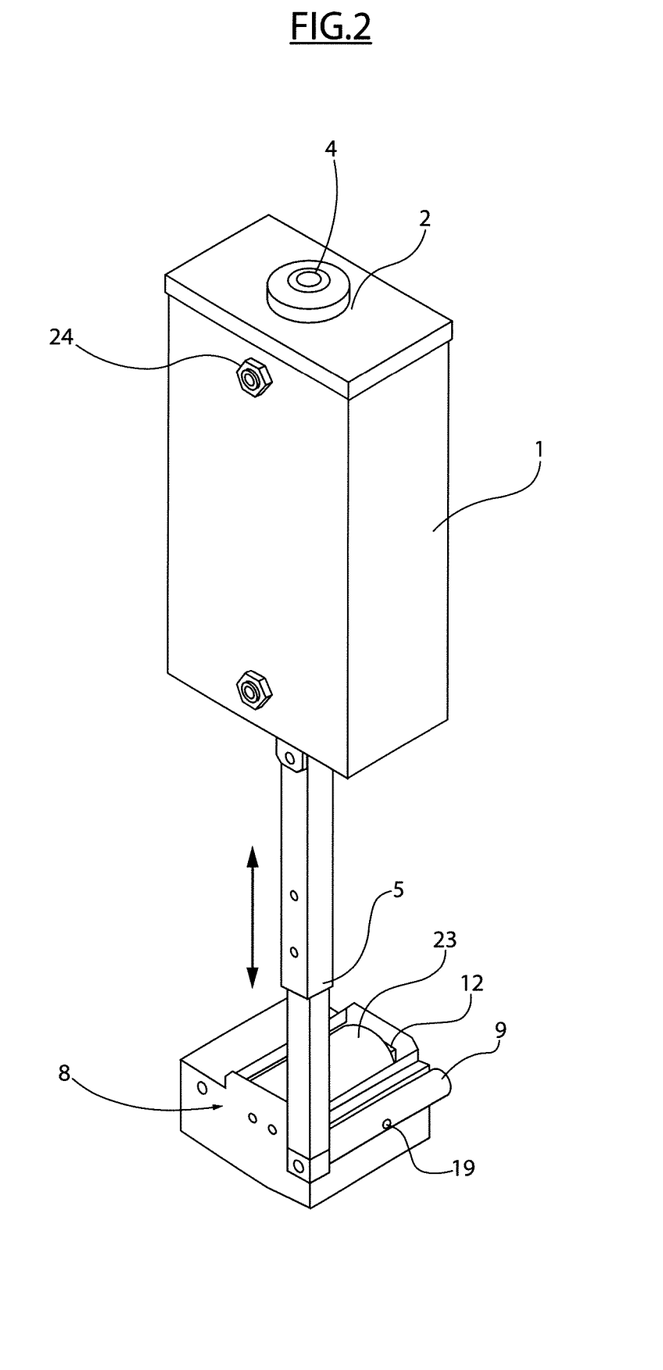

With reference to FIG. 1 and FIG. 2, the device that is the object of the invention is represented.

As shown for example in FIG. 1, a tank 1 is provided.

The tank can be of any shape and volumetric size and is used to contain the disinfectant and/or sanitizing substance used.

In a non-limiting example, a liquid substance can for example be used as a disinfectant and/or sanitizing substance.

This can include, for example, the mixing of water with a disinfectant and/or sanitizer product.

For example, one usable disinfectant and/or sanitizer product could be the product having trade name "Aminosept 10". It is distributed by AEB Spa and some technical information may be found for example at the following Internet link:

https://www.aeb-group.com/it/aminosept-2627

It comes in liquid form and is generally sold in cans of various formats.

The link above refers to the various technical data sheets of the product in question.

Obviously it will be clear that this disinfectant and/or sanitizer is only one non-limiting example of many other usable products.

However, it has proved effective in eradicating various viruses and pathogens such as, in particular, COVID-19.

Returning therefore to the structural description of the invention, FIG. 1 shows the tank 1 which, as shown in FIG. 2, can be loaded with the disinfectant and/or sanitizing substance by removing the upper cap 4 which gives access to the tank 1.

Once the cap 4 has been removed (for example, by unscrewing), it is possible to pour the previously prepared liquid disinfectant and/or sanitizer mix; or a liquid, for example water, can be poured, and then the disinfectant and/or sanitizer substance can be added, the latter substance may be, for example, in powder form to dissolve in water or directly a liquid (for example, the aforementioned "Aminosept 10").

In all cases, the tank serves to contain the liquid mixture or disinfectant and/or sanitizing liquid substance which is fed to the part of the device used for dispensing.

Returning to FIG. 1, the tank 1 is equipped with quick coupling means 11 to be able to connect the tank directly to a structural part of the mobile conveyor for which it is intended.

In a preferred form of the invention, these quick coupling means are in the form of suction cups 11 (one or more than one, for example two) which are particularly suitable for gripping one of the two vertical walls which laterally delimit the conveyor and on which the handrails are arranged.

Figure 5:
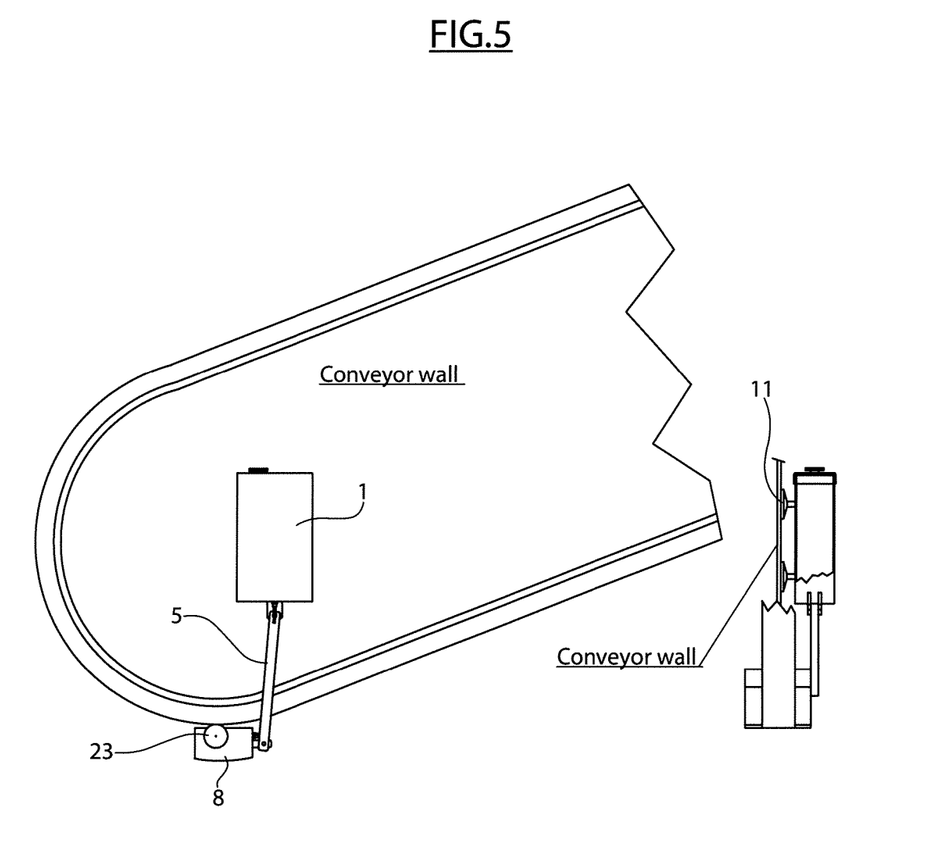
FIGS. 5 to 7 show a schematic application of the device in such a way that it sanitizes the handrail and therefore represent a further example of use.

For example, FIG. 5 schematizes an application through said suction cups to the vertical wall of an escalator or of a conveyor belt for people (for example those used in airports to travel over certain flat distances and formed by a movable plane on which the user stands and is transported along the path).

FIG. 5 shows the suction cups gripping the vertical wall.

The suction cups are an advantageous solution both in economic terms, as the solution is simple, and in terms of installation and removability, since no special installation work is required.

Equivalent systems could, however, also be used such as magnetic systems or quick couplings though these would require some structural intervention on the conveyor structure (for example, installation of the male coupling to the conveyor wall and which releasably mates with the female coupling on the tank, or vice versa).

As shown schematically in FIG. 5, the tank 1 is connected to an arm 5 (see also FIG. 2) which connects the tank with a dispensing assembly, described immediately below.

Figure 6:
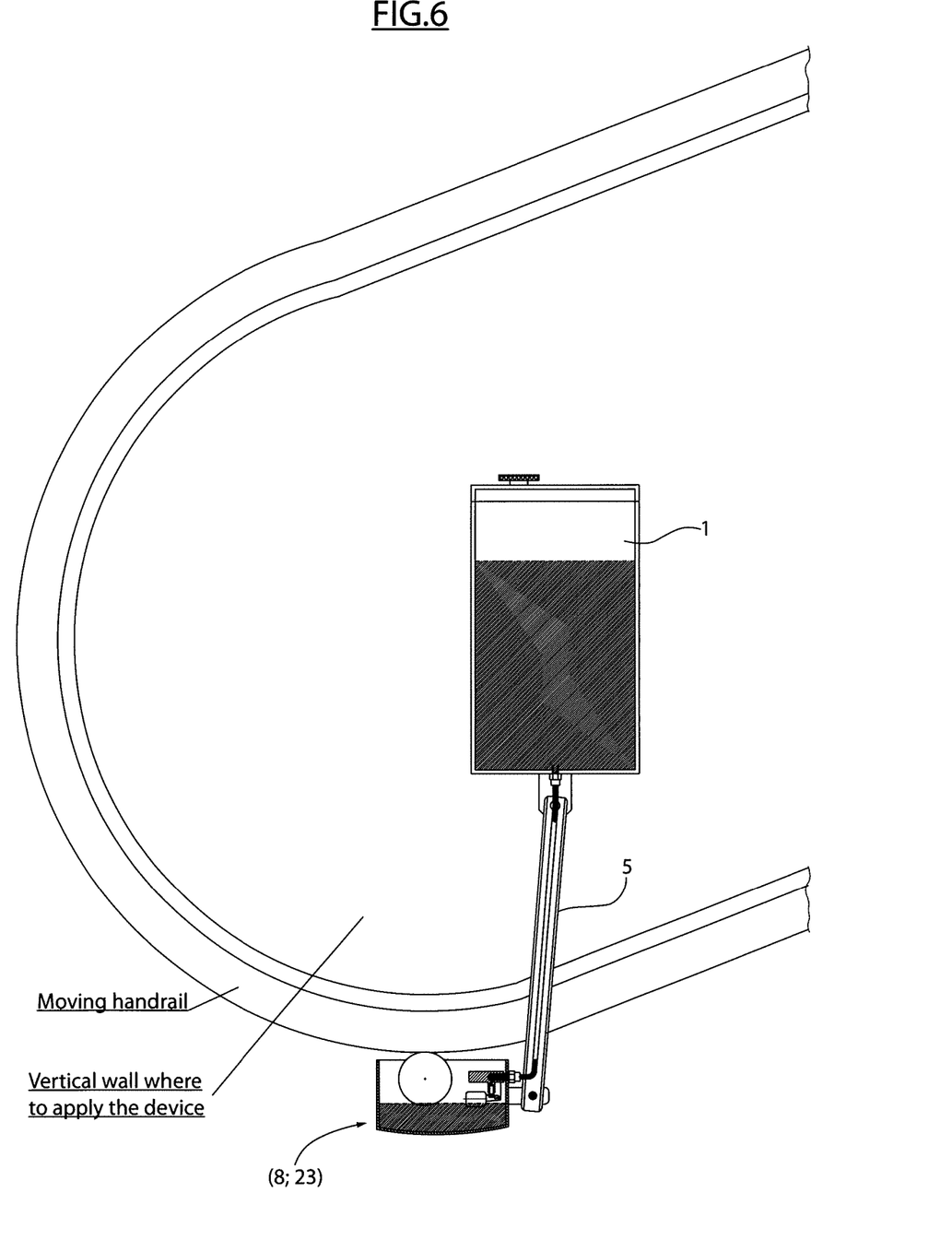
Figure 7:
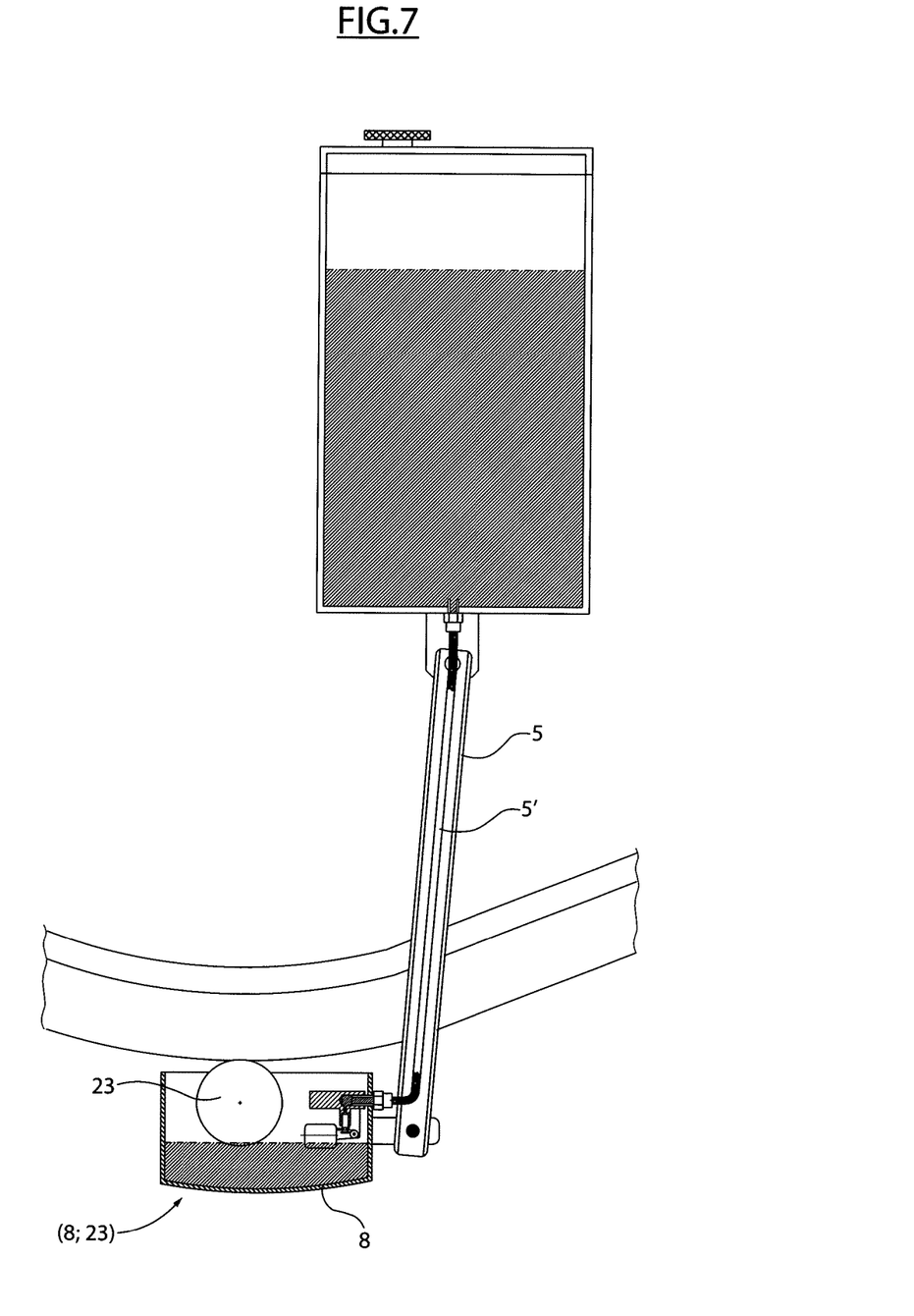

FIGS. 6 and 7 show this application to the handrail in greater detail.

Figure 3:
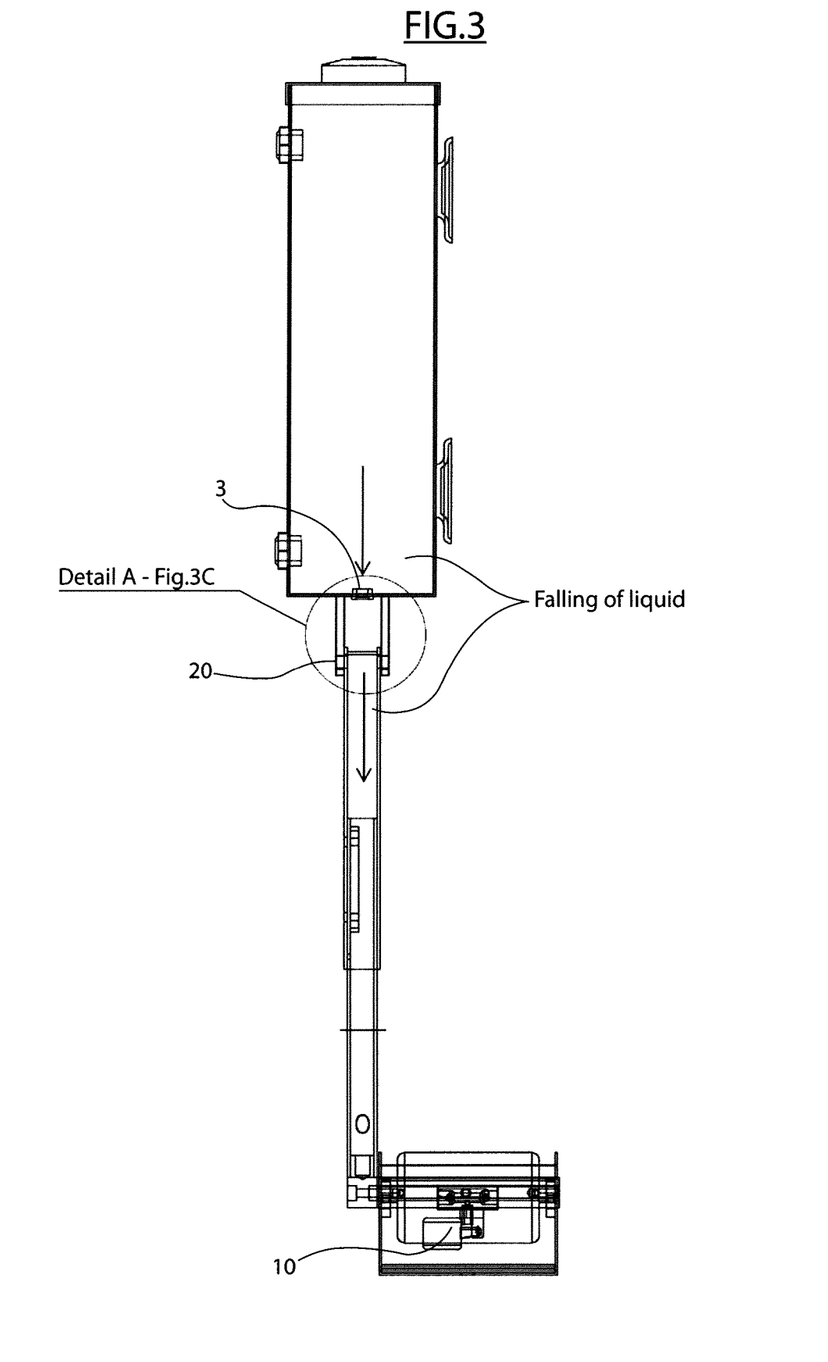
FIG. 3 shows an overall section to better highlight the components of the device.
Figure 3A:
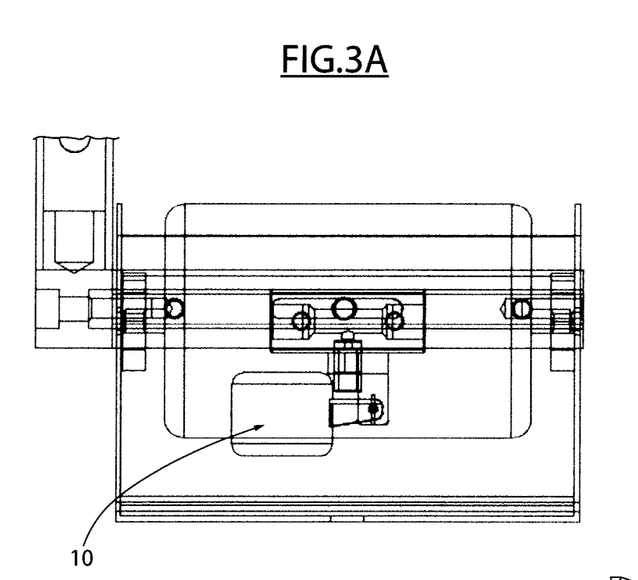
FIGS. 3A and 3B show a further section of the collecting tray where the dispenser roller with the float system is present.
Figure 3B:
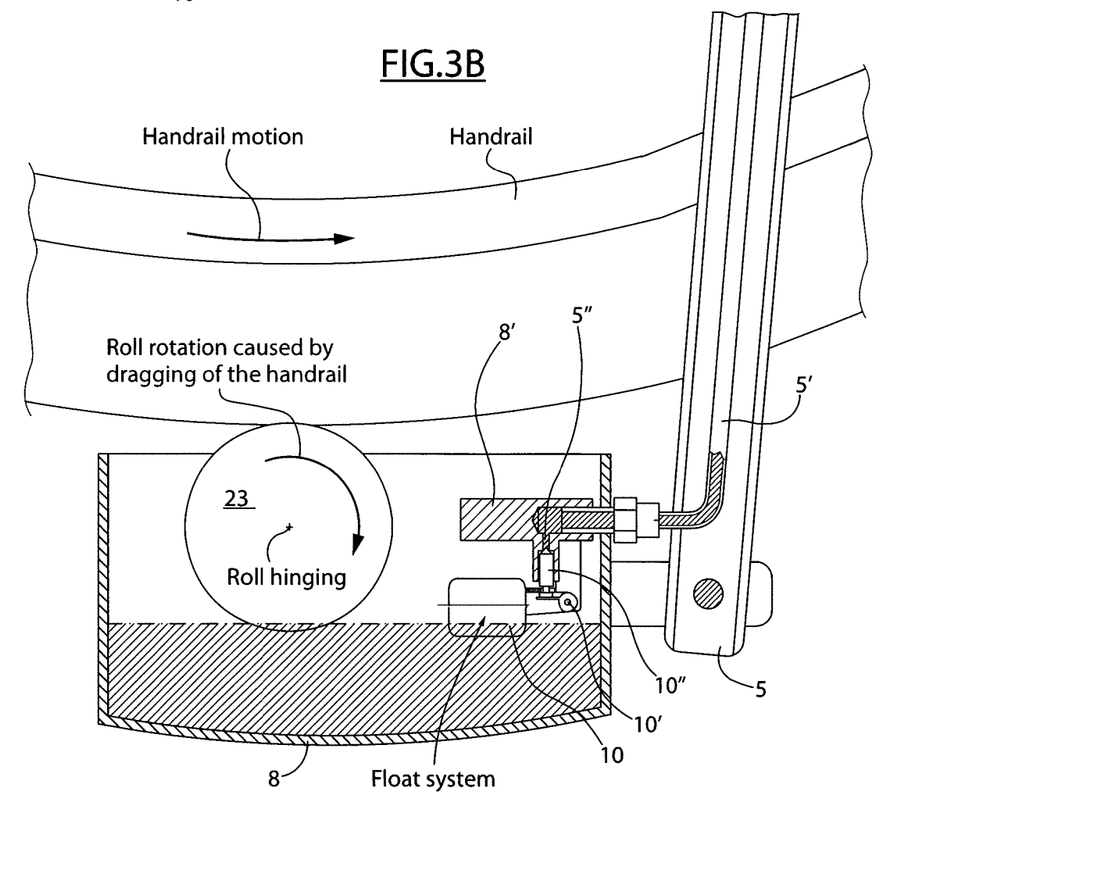

As is evident in FIG. 7, for example, or in the detail of FIG. 3B, this dispensing assembly (or distributing assembly), in the preferred configuration of the invention comprises a rotating dispenser roller 23 and a collecting tray, with said roller rotatably mounted in this collecting tray 8.

The roller can be externally coated with material suitable for releasing substances, for example in the form of bristles, resulting in a cylindrical brush.

The tank 1, in utilization, is positioned above the collecting tray 8 and therefore the disinfectant and/or sanitizing substance, preferably a liquid, falls by gravity into the tray, filling it at least in part.

The rotating roller 23 (which could also be in the form of a cylindrical brush with bristles) is partially immersed in the liquid contained in the tray so that, when it rotates, it draws in the liquid and releases it through contact.

FIG. 3B in fact shows a liquid level with a "float system" which can be provided, which controls the level of liquid in the tray and which is therefore part of the said assembly.

The figure shows the roller 23 which is rotatably hinged and which draws the liquid from the tray to release it through contact on the handrail which slides with respect to the roller.

As better clarified below, the roller is mounted idlingly and is therefore driven in rotation by the moving handrail (see FIG. 3B).

Going to FIG. 1 or 2, the arm 5 is preferably of the telescopic type in such a way as to allow variation of the distance between tank and collecting tray 8.

Furthermore, the arm 5 is hinged at a point 20 (see for example FIG. 3) in such a way as to be able to rotate with respect to the tank and thus be able to assume various angles, as also highlighted in the assembly example of FIG. 5 in which it is clearly inclined with respect to the tank (i.e. the base of the tank is not perpendicular to the arm 5 but rather inclined).

The arm 5 is connected to the tray 8, thus acting as a structural connection between tank and tray.

The fluid communication (in particular the liquid communication) between tank 1 and collecting tray 8 is instead obtained with a duct 5', for example a plastic tube, preferably flexible or deformable (for example made of rubber).

The duct is preferably arranged inside the arm 5 and therefore coaxial to it.

Figure 3C:
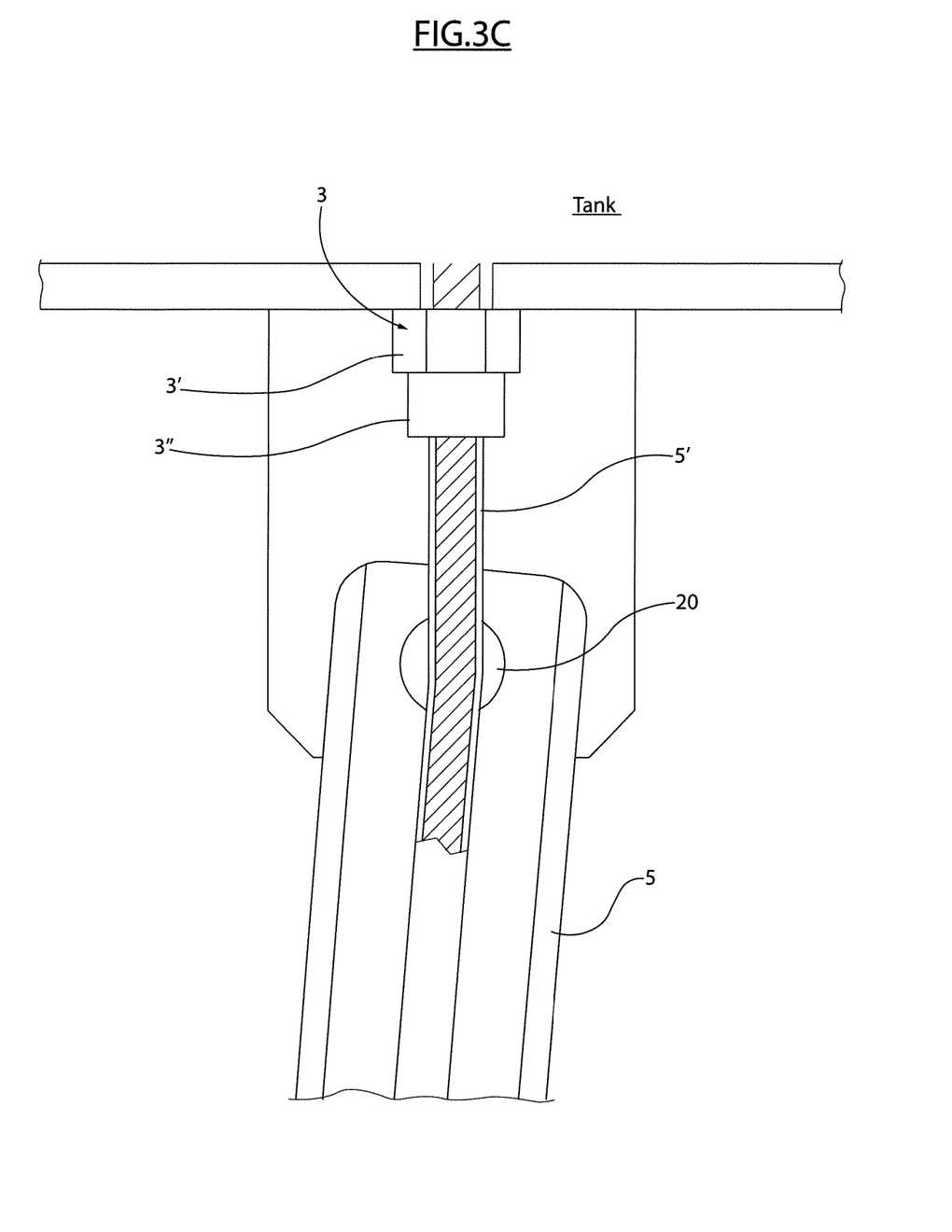
FIG. 3C shows the quick coupling of the end of the telescopic arm to the tank with relative duct 5' which, with a quick coupling, is connected to the tank and which runs inside the telescopic arm.

For example, FIG. 3C shows the portion of the duct 5' which connects to the tank 1 and which is directed towards the tray 8, running coaxially inside the telescopic arm 5.

The tube 5' is therefore connected by one end to a connection point 3 on the tank 1.

The connection is a quick coupling in which part 3" engages in part 3' integral with the tank for a quick connection.

The duct 5', as better highlighted in FIG. 3B, ends at the tank, thereby supplying the liquid whenever necessary.

By simple gravity, therefore, the liquid falls from the tank, placed above the tray, towards the tray, thus filling the collecting tray.

As shown in greater detail in FIG. 3B, there is therefore a float system that controls the level by blocking the supply of liquid when the tray is too full.

As better shown in FIG. 3B, therefore, a float 10 is included.

The float floats in the liquid and therefore occupies a position according to the level of liquid present in the tray 8.

The float 10 is hinged at a point 10' to rotate around that point through an arm.

The arm (for example an extension of the same float) integrally mounts an occlusion pin 10" which occludes an inlet (5"') of the liquid leaving the terminal part of the duct 5' so shutting off the flow of liquid towards the collecting tray.

Depending on the level of liquid in the tray 8, the float rotates around the hinge and acquires a certain position, bringing the needle between an occlusion position and a free position.

The duct 5' is connected, preferably in a removable way, to a structural portion 8' of the tray 8 and placed inside it. This structural part 8' forms a terminal path provided with an outlet (5") and which is connected to the duct 5'.

The liquid coming out of the duct 5' enters the terminal part to leave through the outlet (5").

The pin 10" is shaped with a tip which, if brought close to the outlet 5" of the terminal path obtained in the portion 8', it occludes it while if removed it frees it.

As the tray 8 empties, the float drops in level and, rotating around the hinge 10', moves the 10" pin away from the outlet 5", freeing it and allowing the liquid to fall into the tank by gravity.

Also in this case, the duct 5' is quickly connected to the part 8' through a quick coupling, for example identical to the one (3', 3") of FIG. 3C.

Therefore, in accordance with the section of FIG. 3, the tank is highlighted that is intended to contain the liquid which falls, by gravity, towards the duct to feed the collecting tray.

With reference to FIG. 3B, the roller in the tray is rotatably mounted idlingly so that, when it comes into contact with the handrail, it is dragged into rotation by the handrail.

During its rotation it draws liquid from the tray and releases it on the handrail.

Although the idle roller solution of the present invention is preferred, a motorized roller solution is an alternative, which is however not part of the present invention.

Alternatively, also not according to the present invention, the roller could be replaced by a sprayer placed in front of the handrail at a certain distance and which sprays the liquid coming from the tank. Although feasible, this solution is not preferred as it is complex.

The tank is placed higher up than (i.e. above) the collecting tray in such a way as to be able to feed it by gravity.

However, a solution with a pump that facilitates feeding of the liquid from tank 1 to the collecting tray is an alternative (although it is not preferred and not part of the present invention).

The roller 23, as said, may be made of various materials which absorb the liquid drawn from the tray so as to soak up this liquid before releasing it through contact on the handrail.

Returning to FIG. 2, the structural connection that connects the tray to the arm 5 is better specified.

In particular, FIG. 2 further shows a transversal section 9 which is fixed transversally to the end of the telescopic arm 5 in such a way as to be placed orthogonally with respect to it.

The telescopic arm is connected to the collecting tray through this section 9.

The section 9 is formed externally by a substantially cylindrical or cylindrical element.

Figure 8:
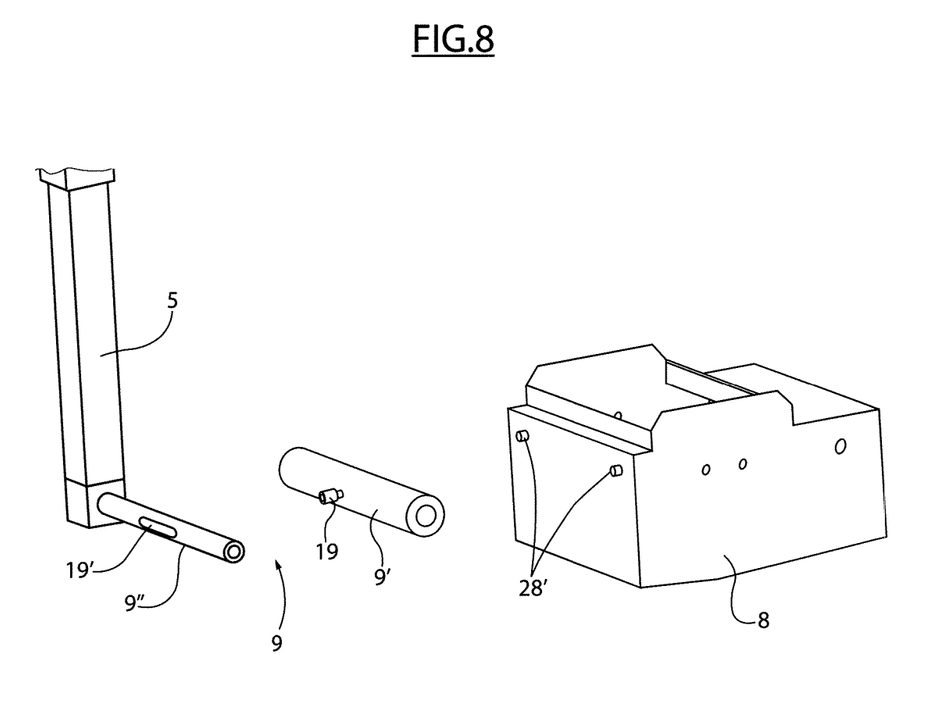
FIG. 8 shows an exploded view of the connection of the tray 8 to the vertical arm 5 (i.e. the telescopic arm) with a connection that allows a further adjustment of the distance of said tray with respect to the vertical arm 5.

More particularly, with reference to FIG. 8, an exploded view is shown which highlights the preferred solution.

The transverse element 9 which connects to the telescopic arm 5 is formed by two coaxial elements (9', 9"), of which the external one 9' is mounted slidingly with respect to the internal one 9".

The internal element 9" is made integral (for example welded or in a single piece) with the end of the telescopic bar 5.

The two coaxial elements (9', 9") can be substantially cylindrical in shape. The external cylinder 9' is fixed to the tray for example by means of two threaded dowels 28' which are screwed to the tray and which are inserted and fixed in the receiving holes of the external cylinder 9'.

Other equivalent systems could provide a stable connection by fixing, in a stable manner, the external cylinder 9' to the tray by welding or, for example, by making the whole all in one piece or by gluing or similar.

In any case, the external cylinder 9' and the tray 8 are connected together in an integral way.

Preferably, the external cylinder 9' has a beveled part that is flat so as to adhere well to the flat wall of the tray 8 with which it is in abutment.

Figure 9:
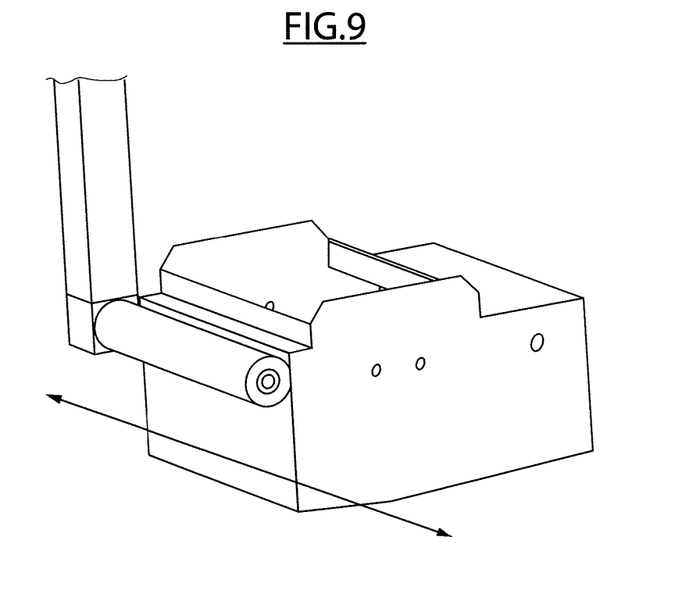
FIG. 9 shows a direction of motion for this adjustment of the tray with respect to the arm 5.

The external cylinder 9' slides smoothly into the internal cylinder 9" and therefore, depending on its position, enables adjustment of the distance between the tray and the arm 5 along the longitudinal axis of the internal cylinder 9" which actually acts as a sliding guide (see, for example, the double direction of the arrow in FIG. 9).

The external cylinder 9' is provided with a threaded dowel 19 which is screwed inside a transversal channel obtained in the external wall of the external cylinder 9' in such a way as to be able to penetrate into the axial channel of said external cylinder 9' or be extracted therefrom. In this way, according to its degree of screwing, it can intercept the slot 19' obtained by milling, in order to generate a flat anchoring surface in the internal cylinder 9", thereby tightening the external cylinder in position with respect to the internal cylinder.

It is therefore possible, simply and rapidly, to adjust the distance of the tray 8 from the arm 5 along a guide which corresponds to the internal cylinder 9" (axis orthogonal to the axis of the telescopic arm 5). Once the desired position has been found, the dowel 19 is tightened by screwing until it intercepts the slot 19'.

Advantageously, the preferred solution provides for a connection of the device directly to the wall of the mobile conveyor on the outside of the wall.

In one possible variant, the solution is not excluded in which the device is installed directly inside the conveyor and therefore integrated with it.

For example, inside the walls of the conveyor (for example, the escalator), it could be possible to integrate a tank connected to the tray described with the roller and with the tray fixed to a structural part in such a way as to bring the roller into contact with the belt. The tank then has a filling opening with access from the outside. As mentioned, as an alternative that is not part of the present invention, again in this case the roller could be replaced with a spray system or in any case a remote ejector.

Figure 4:
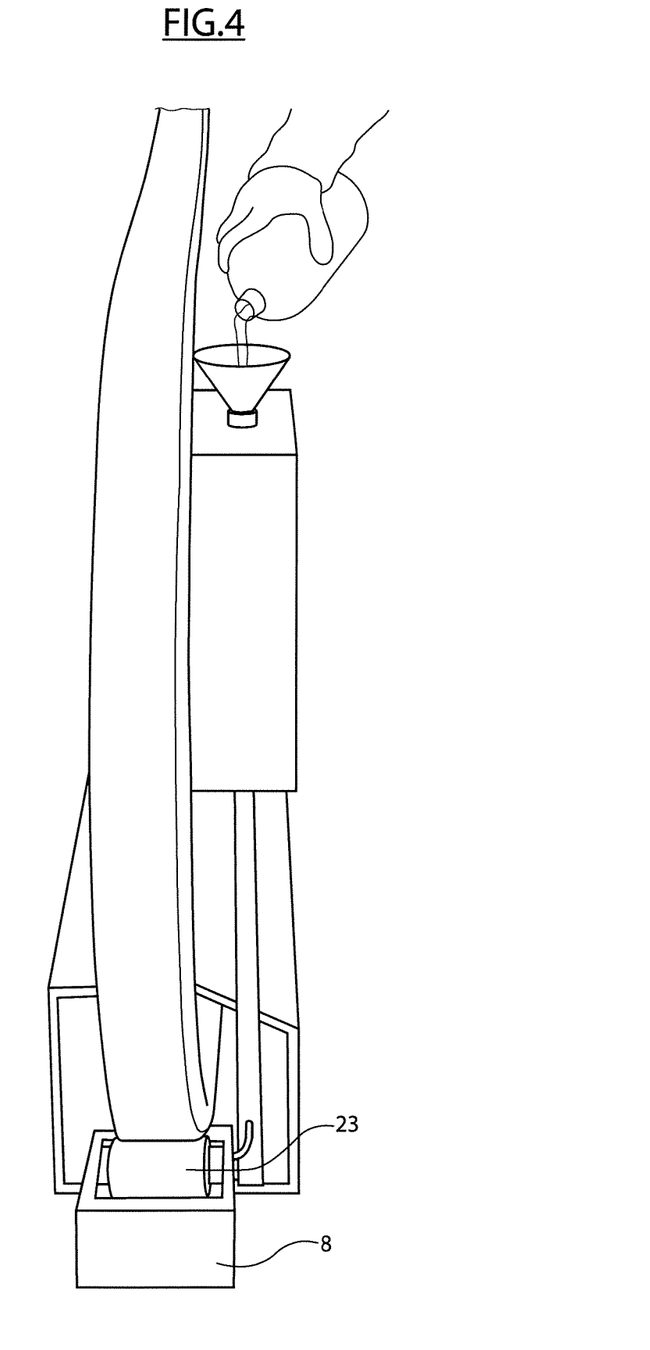
FIG. 4 is an example of use with the device applied to a handrail of a conveyor belt while the tank is being loaded with a sanitizing substance.

In utilization, during assembly and as schematized in FIG. 4 and in FIGS. 5-7, the roller 23 is mounted in contact with the ring constituting the handrail in the part facing the ground and with the tank fixed to the vertical wall in such a way that it is at a greater height than the collecting tray.

The tank can therefore be fixed to the vertical wall using the suction cups.

The duct 5' is connected, preferably with a quick coupling, to the tank.

It is therefore possible to proceed with fixing the other end of the duct 5' to the tray.

The tray is positioned in such a way that the roller is in contact with the handrail with the tray fixed to the arm 5, once the correct length of the arm 5 has been adjusted so that the roller is in contact with the handrail.

The telescopic arm can maintain the selected length by locking it with various systems well known in the field.

The roller 23 is therefore now in contact with the belt (or handrail) as shown in FIGS. 6 and 7.

Preferably, the tank is fixed to the vertical wall on the side of the external wall with respect to the corridor for the passage of users delimited by the two vertical walls.

In this way, when the device is applied and operated during normal operation of the conveyor, it does not risk being struck by persons using the conveyor (for example, the escalator and/or conveyor belt) as it is external to the conveyor's channel of use.

In accordance with this solution, the motion of the handrail drags the roller 23, which is idling, into rotation. Rotating, the roller soaks up the substance contained in the tray and releases the substance to the handrail through contact.

When the liquid level falls below a certain value, the float moves and frees the access 5" for other liquid to drop and feed the tray.

Such a device, preferably installed on the external part of the conveyor corridor, once installed, works in synchrony with the normal operation of the conveyor, thus disinfecting continuously and effectively.

FIG. 4 schematizes the loading of the disinfectant into the tank while FIGS. 5-7 show the roller 23 partially immersed in the tray and in contact with the handrail and the level also present in the tank 1.

The roller is then positioned in contact with the belt in such a way that the tray is under the belt and the arm is extended and inclined in the most convenient position so as to be able to fix the tank in position, by fixing it for example with the suction cups to the conveyor structure.

The movement of the belt will automatically cause rotation of the roller which, in rotating, soaks up the substance present in the tray and releases it through contact on the handrail.

The collecting tray is preferably fed by gravity from the tank.

In this description, in a non-limiting manner, the term "sanitize" or equivalently "disinfect" means a cleaning action designed not only to clean but also and in particular to eradicate and therefore eliminate or render harmless possible pathogens (for example viruses and/or bacteria) of various kinds, such as for example covid_19, which are dangerous for human health in such a way as to prevent contagion through contact.

It is clear that the device and its use, included in the present invention, may also include the dispensing of simple cleaning substances (for example degreasers, such as normal soaps) not having specific sanitary characteristics and suitable for sanitization but without departing from the present inventive concept on this account. In this case we speak generically of cleaning.

The described device is therefore applicable to mobile conveyors, such as for example escalators or moving walkways. In both cases, a mobile surface is provided (for example, stairs or a simple plane) delimited by two vertical walls and forming a corridor and around whose walls a mobile handrail is provided.

The device described is therefore preferably applied to the vertical walls in such a way as to be outside the conveyor (therefore visible) and preferably applied on the part of the wall facing the outside of the corridor it delimits.

However, as mentioned, a solution which integrates said device inside the conveyor and therefore at least partially not visible is not excluded.

The invention claimed is:

1. A device for sanitizing or cleaning a handrail of a mobile conveyor, the device comprising:
    a tank for containing a sanitizing or cleaning substance;
    means for connecting said device to the mobile conveyor;
    a dispensing assembly of said sanitizing or cleaning substance, said dispensing assembly comprising a dispenser roller and a collecting tray;
    a feeding path for feeding said sanitizing or cleaning substance from the tank to the dispensing assembly,
    wherein said dispenser roller is rotatably mounted at least partially inside said collecting tray so as to deliver, in use, said sanitizing or cleaning substance, and wherein said dispenser roller is rotatably mounted idingly,
    wherein said tank is connected to the collecting tray with an arm whereby, in use, the tank is positioned above the tray,
    wherein said arm is telescopic and adjustable to different lengths, and is further hinged to the tank so as to be able to position the collecting tray at different angles in relation to the tank,
    wherein said means for connecting said device to said mobile conveyor comprise quick coupling means, and
    wherein said quick coupling means are applied to the tank and are configured to enable, in use, fixing the tank to a part of said mobile conveyor with the tank placed above the collecting tray, thereby feeding the collecting tray by gravity and with said dispenser roller in idle state placed under said tank in contact with the handrail of the mobile conveyor so as to be dragged into rotation by a motion of said handrail.

2. The device according to claim 1, wherein said feeding path comprises at least one duct which connects the tank to said dispensing assembly.

3. The device according to claim 2, wherein said duct is connected on one side to the tank and on an opposite side to said collecting tray so as to be able to feed said collecting tray.

4. The device according to claim 1, wherein said quick coupling means comprise, or are shaped as, one or more suction cups.

5. The device according to claim 1, further comprising a float arranged inside of the collecting tray, said float being equipped with an occlusion system which blocks an access of a liquid to the collecting tray in such a way as to occlude said access when a predetermined level of said liquid is reached in the collecting tray.

6. The device according to claim 1, wherein said dispenser roller is a cylindrical bristle brush.

7. A device for sanitizing or cleaning a handrail of a mobile conveyor, the device comprising:
    a tank for containing a sanitizing or cleaning substance;
    means for connecting said device to the mobile conveyor;
    a dispensing assembly of said sanitizing or cleaning substance, said dispensing assembly comprising a dispenser roller and a collecting tray; and
    a feeding path for feeding said sanitizing or cleaning substance from the tank to the dispensing assembly,
    wherein said dispenser roller is rotatably mounted at least partially inside said collecting tray so as to deliver, in use, said sanitizing or cleaning substance, and wherein said dispenser roller is rotatably mounted idingly,
    wherein said tank is connected to the collecting tray with an arm whereby, in use, the tank is positioned above the tray,
    wherein said means for connecting said device to said mobile conveyor comprise quick coupling means,
    wherein said quick coupling means are applied to the tank and are configured to enable, in use, fixing the tank to a part of said mobile conveyor with the tank placed above the collecting tray, thereby feeding the collecting tray by gravity and with said dispenser roller in idle state placed under said tank in contact with the handrail of the mobile conveyor so as to be dragged into rotation by a motion of said handrail, and
    wherein the collecting tray is connected to the arm through an external sleeve mounted slidingly along a guide placed transversally with respect to said arm in such a way as to be able to adjust a distance between the tray and the arm.

8. The device according to claim 7, further comprising means for fixing a preselected position, thereby blocking a sliding of the external sleeve with respect to the guide along which the external sleeve is slidingly mounted.

9. A method for sanitizing or cleaning a handrail of a mobile conveyor, comprising:
    applying a device according to claim 1 to the mobile conveyor; and
    filling the tank of the device with the sanitizing or cleaning substance.

10. The method according to claim 9, further comprising causing the dispensing assembly to sanitize or clean the handrail.

11. The method according to claim 10, wherein the dispensing assembly comprises the dispenser roller rotatably mounted idlingly inside the collecting tray, and wherein said device is mounted in such a way that the dispenser roller is facing in contact with the handrail and dragged into rotation by the motion of the handrail.

* * * * *